Nov. 1, 1966
R. A. SOMERS ET AL
3,283,192
BATTERY OPERATED ELECTRIC SHAVER AND CHARGER
Original Filed Jan. 11, 1960
3 Sheets-Sheet 1
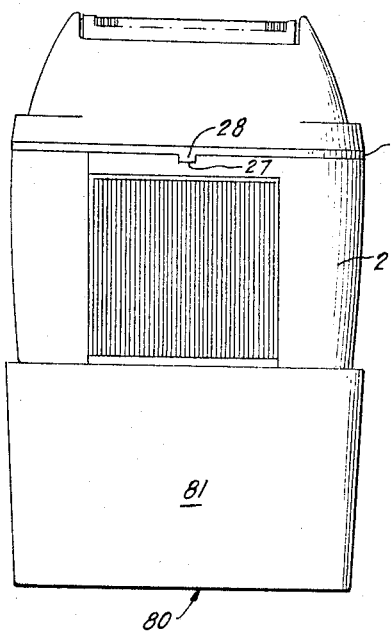
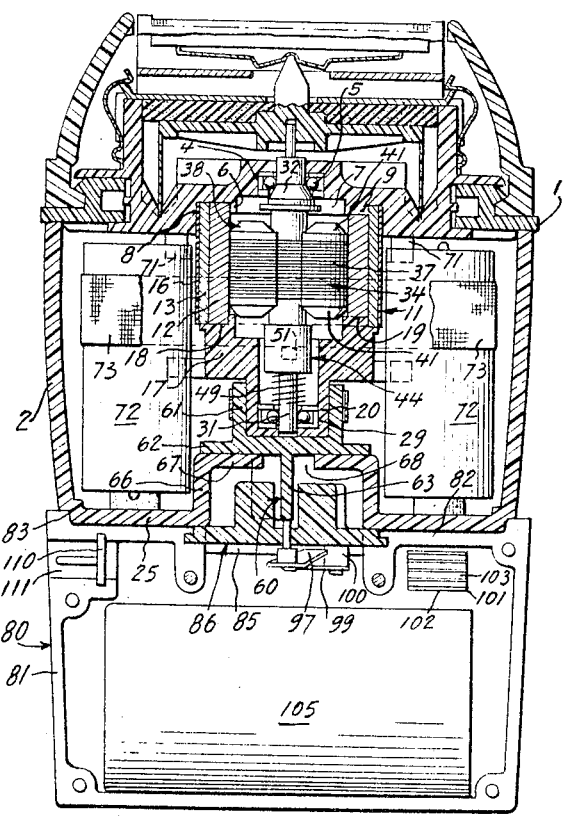
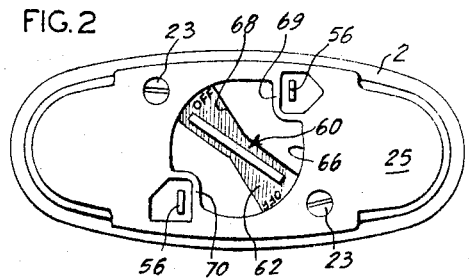
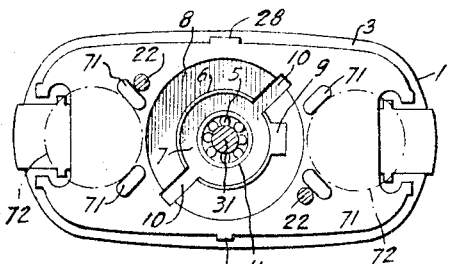
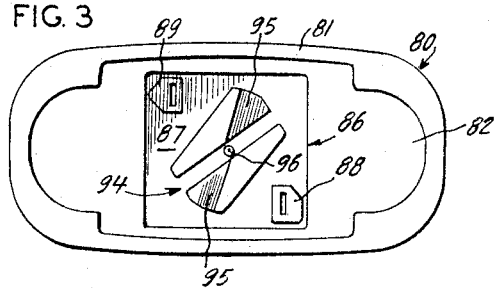
INVENTORS
RAYMOND A. SOMERS
ROBERT J TOLMIE

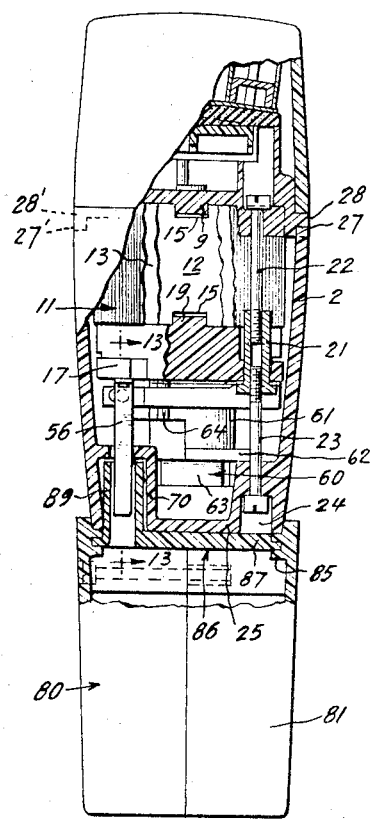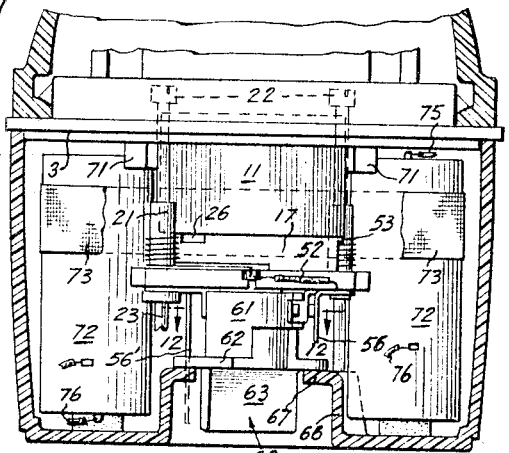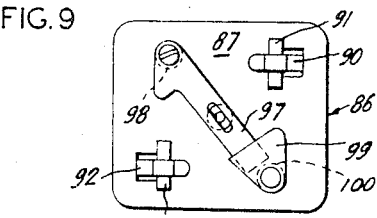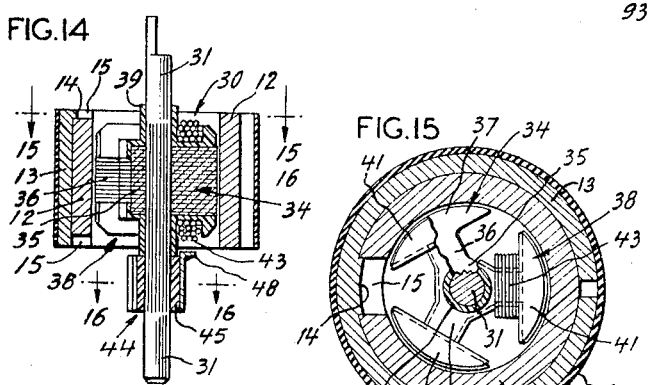

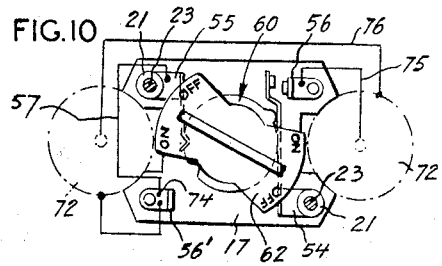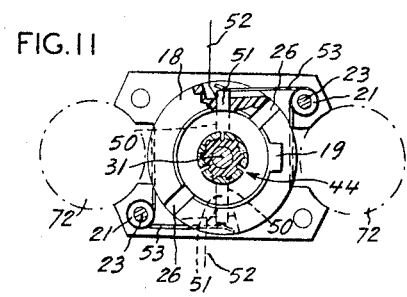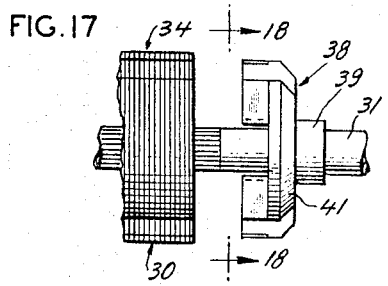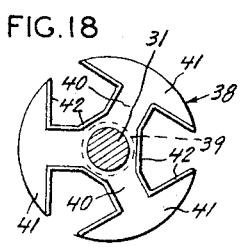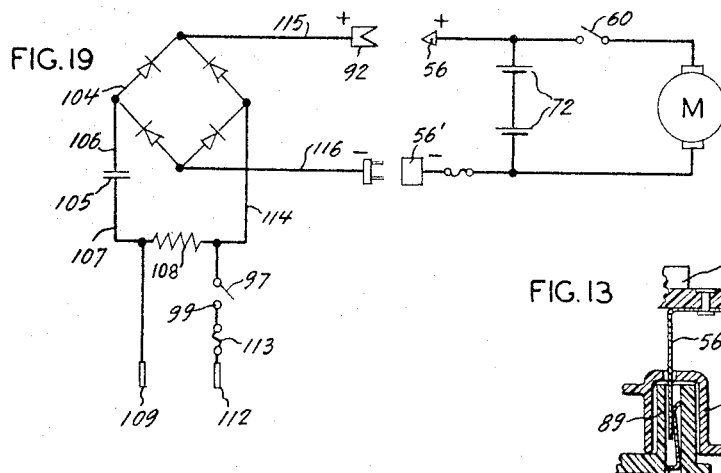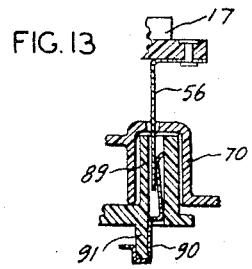

United States Patent Office 3,283,192
Patented Nov. 1, 1966

3,283,192
BATTERY OPERATED ELECTRIC SHAVER
AND CHARGER
Raymond A. Somers and Robert J. Tolmie, Fairfield, Conn., assignors to Sperry Rand Corporation, New York, N.Y., a corporation of Delaware
Original application Jan. 11, 1960, Ser. No. 1,546. Divided and this application June 16, 1965, Ser. No. 481,996
4 Claims. (Cl. 310—269)

This invention relates to new and useful improvements in armatures and is a division of our copending application S.N. 1,546, filed January 11, 1960.

The invention provides an electric motor having an improved armature construction in which an armature shaft is provided with intermediate portions knurled for rigidly attaching a commutator body on an intermediate portion of the shaft by engagement of the inner edges of laminations forming the body with the knurling on the shaft. Plastic spools are engaged with opposite ends of the armature body and are formed with flanges to surround the radially extending arms on the armature poles at the ends of the arms for supporting armature windings about the radial arms in spaced relation with respect to the arms on armature poles on the body to provide an inexpensive and efficient armature construction. The armature construction also includes a commutator formed of a plastic body having a pressed fit on a knurled portion of the armature shaft adjacent the armature body carrying commutator segments on the outer surface secured thereto by interlocking portions of the plastic and commutator segments with the outer surfaces of the commutator segments arranged in cylindrical relation. This provides an armature which is inexpensive to construct by providing a plurality of parts that may be easily assembled on the shaft by pressing the parts together in which spool members are arranged at the ends of the armature body for insulating the armature body from the coil windings mounted thereon.

In the drawings:

FIG. 1 is a side elevation of a battery operated electric dry shaver and charger in engaged relation and in which shaver is incorporated an embodiment of the present invention.

FIG. 2 is a bottom plan view of the shaver.

FIG. 3 is a top plan view of the charger.

FIG. 4 is a vertical longitudinal cross-section through the shaver charger assembly as shown in FIG. 1.

FIG. 5 is an inside elevation showing the supporting section of the casing.

FIG. 6 is an end elevation of the shaver and charger assembled as shown in FIG. 1 with portions broken away and shown in cross section.

FIG. 7 is a longitudinal cross section of the shaver with the casing portions broken away and shown in cross section for illustrating the motor and battery assembly in side elevation.

FIG. 8 is a side elevation of the plug contact member with the adjacent portions of the charger casing shown in cross section.

FIG. 9 is a bottom plan view of the plug contact member.

FIG. 10 is an end elevation showing the supporting or cap member of the motor assembly and the control switch.

FIG. 11 is an inside elevation showing the inner face of the supporting or cap member which engages the end of the stator assembly.

FIG. 12 is a cross section taken on line 12—12 of FIG. 7.

FIG. 13 is a cross section taken on line 13—13 of FIG. 6.

FIG. 14 is a longitudinal cross section through the electric motor stator and armature assemblies.

FIG. 15 is a cross section taken on line 15—15 of FIG. 14.

FIG. 16 is a cross section taken on line 16—16 of FIG. 14.

FIG. 17 is an enlarged fragmentary side elevation of the armature illustrating how a plastic spool is applied to the armature shaft.

FIG. 18 is a cross section taken on line 18—18 of FIG. 17.

FIG. 19 is a wiring diagram.

An electric dry shaver incorporating an embodiment of the present invention has a casing formed of a supporting section 1 and a cover section 2. Supporting section 1 is formed with a seat 3 for receiving the open end of cover section 2, as clearly shown in FIGS. 4 and 5. Supporting section 1 forms an end member and support for the electric shaver motor. Supporting section 1 is preferably formed of non-magnetic material and for the purpose of the present invention both the supporting and the cover section of the casing are formed of a suitable plastic which incorporates insulating properties, as well as being non-magnetic. The side of supporting section 1 facing cover section 2 is formed in the center portion with an aperture extending through the supporting section, a thrust bearing seat 4 in the form of a recess opening toward the interior of the casing to receive thrust bearing 5. Supporting section 1 is formed with an annular flange 6 defining a recess 7 formed about thrust bearing seat 4. Recess 7 extends inwardly from the inner face of supporting section 1 a greater distance than annular recess 8 forming a stator seat. Annular flange 6 extends inwardly toward the rear face of supporting section 1 a short distance from the inner end of annular recess or stator seat 8 and is formed with a key projection 9 extending into recess 8 for fixing the position of the stator when engaged with supporting section 1 in a manner which will be hereinafter described. Supporting section 1 is formed with radial channels 10 to provide air circulation through the inside of the motor for cooling purposes.

A permanently magnetized stator assembly 11 is provided for the electric motor or machine. Stator 11 for the motor illustrated in the drawings is tubular and more specifically of cylindrical form having a length of approximately three-fourths of an inch. The inside diameter of the stator is approximately seven hundred sixty-thousandths of an inch. The stator has an inner cylindrical field member 12 with an inside diameter of approximately seven hundred and sixty thousandths of an inch as stated above and a thickness of approximately one hundred fifty thousandths of an inch. The outside diameter of inner field member 12 would be approximately one and sixty thousandths inches. Inner field member 12 has sliding frictional engagement with an outer split ring 13. Split ring 13 has a thickness of approximately sixty two thousandths or one sixteenth of an inch. Outer split ring 13 is formed of sintered powdered iron. Inner field member 12 is formed of barium ferrite molded into cylindrical shape. Outer split ring 13 has a slot extending longitudinally of approximately one-sixteenth of an inch in width. Opposite the slot in outer split ring 13, one end of split ring 13 is formed with an inwardly extending key projection 14 adapted to fit in one of key slots 15 formed in opposite ends of inner field member 12 in longitudinally aligned relation. Key slots 15 in field member 12 and key projection 14 on split ring 13 cooperate to fix the relation of field member 12 to split ring 13 when these two parts are assembled together to form the stator for the electrical machine or motor.

The assembled inner field member 12 and split sleeve 13 are permanently magnetized at a pair of opposite portions to form a pair of stator poles with the centers of the poles aligned in radial relation with said longitudinal slot in sleeve 13 and key slots 15. The arcuate section of a magnetized pole extends circumferentially through an arc of approximately ninety degrees from the axis of the sleeve. The outer cylindrical surface of assembled stator 11 is provided with an insulating covering 16. This covering may be a suitable type of insulating fabric secured to the outer surface of stator 11 by a suitable adhesive and is provided for the purpose of protecting the stator against adjacent parts having electrical contact therewith. This covering 16 further provides a means for placing tension on the outside of split ring 13 to firmly secure this ring on inner field member 12. The outside diameter of stator assembly 11 is approximately one and twenty-one hundredths inches.

Key slots 15 are also provided for fixing the position of stator assembly 11 in the end members for the motor or electrical machine. Key slot 15 in one end of inner field member 12 is adapted to receive key projection 9 in annular recess 8 forming the stator seat when one end of stator assembly 11 is engaged in recess 8 until the end wall of the stator engages the bottom of recess or stator seat 8. The position of the stator is therefore fixed by key 9 and key slot 15 relative to supporting section 1 for a purpose that will be hereinafter described.

Supporting end or cap member 17 is engaged on the opposite end of stator assembly 11. Supporting member 17 is formed of a plate portion having a recess 18 formed to receive the end of stator assembly 11 and a key projection 19 formed to engage in key slot 15 in the engaged end of stator 11 for fixing the position of supporting or cap member 17 relative to supporting member 1. Cap member 17 has the center portion formed with a bearing projection 20 extending outwardly from the side opposite recess 18 therein to provide a cylindrical housing arranged in coaxial relation with the stator assembly and mounting a commutator shaft bearing 29 in the outer end wall. Supporting or cap member 17 is formed of non-magnetic material of a suitable type and in the case of the present invention is formed of molded plastic material to provide an insulated end member for the motor or electrical machine. The outer periphery of member 17 is of generally rectangular shape and at a pair of opposite corners is provided with threaded metal bushings 21 pressed in the plastic of the cap member. These bushings are located on portions of cap member 17 projecting beyond the outer surface of stator assembly 11 and are open at both ends so that screw threaded fastenings may be received in opposite ends of each bushing extending in substantially parallel relation to the outer surface of cylindrical stator assembly 11. Supporting section 1 forming a cap or end member for the motor or electrical machine is provided with apertures aligned with metal bushings 21 for receiving attaching screws 22. Attaching screws 22 operate to firmly secure cap member 17 and stator assembly 11 in assembled relation on supporting section or end member 1 in which thrust bearing 5 and bearing 29 are in axially aligned relation.

Supporting or cap member 17 is formed with radially extending ventilating slots 26 on the inner face to provide for air passage between the inside of stator assembly 11 and the space in the casing outside thereof.

Cover section 2 is secured to supporting section 1 by having attaching screws 23 engaged in sockets 24 in end wall 25 of the cover section. Screws 23 extend through apertures in end wall 25 and are threadedly engaged in the ends of metal bushings 21 molded in cap member 17. When screws 23 are tightened in the bushings 21 after cap member 17 is secured by screws 22 to supporting section 1, cover 2 will be firmly secured with the open edge engaged on seat 3 of supporting section 1 to retain the shaver casing in assembled relation for enclosing the motor and other parts to be described.

Cover section 2 has the free edge formed with positioning recesses 27 and 27' of different size on opposite side portions thereof which receive positioning projections 28 and 28' on opposite sides of supporting section 1 in seat 3. This arrangement provides for assembly of cover section 2 on supporting section 1 in only one position to insure a fixed relation between cover section 2 and cap member 17.

An armature 30 has an armature shaft 31 with opposite ends rotatably mounted in bearings 5 and 29 to rotatably support the armature in axial relation with stator assembly 11. Armature shaft 31 mounted in bearing 5 has a thrust bearing cone 32 mounted on the end of the shaft for engaging thrust bearing 5 to maintain the armature in a fixed position for rotation by having thrust bearing cone 32 constantly engaged with thrust bearing 5 to maintain the position of the armature against axial movement during rotation. The means for accomplishing this will be hereinafter described.

The intermediate portion of armature shaft 31 is provided with a knurled surface 33. An armature body 34 is formed of a plurality of laminations each formed to provide a central section 35, radially extending arms 36 and pole pieces 37 at the outer ends of said arms. These laminations are of uniform size and shape, are assembled in registering relation to form radial arms on the armature body extending from the central portion, have the pole pieces at the outer ends of the body arranged in circumferential relation and an outer arcuate surface having the same radius from the center of the armature shaft. These laminations are formed with the usual insulating material covering and are engaged in face-to-face contact to form an assembled laminated armature body 34. This body is pressed on to shaft 31 by having a hole forming the central aperture in the body of a size adapted to engage knurled surface 33 for rigidly holding the armature body in position on an intermediate portion of the armature shaft so the shaft will rotate therewith. The outer arcuate face of each pole piece on the armature body has a length extending through an arc of ninety degrees projected from the axis of armature shaft 31. The sides of pole pieces 37 overhang the sides of arms 36. The gap between the ends of adjacent pole pieces 37 extends through an arc equal to about ⅓ the length of the arcuate face of one pole piece.

Plastic spools 38, preferably formed of molded nylon, are provided with central cylindrical portions 39 adapted to be slidably engaged on armature shaft 31 at opposite ends of armature body 34. Spools 38 have radially extending arms 40 and heads 41 corresponding in shape to arms 36 and pole pieces 37 of armature body 34. Center cylindrical portions 39, arms 40 and heads 41 of spool 38, have a slightly larger dimension than the corresponding parts of armature body 34, so as to extend beyond the sides 37 and outwardly beyond center section 35 of the armature body. Laterally extending flanges 42 are formed on marginal portions of center portions 39, arms 40 and heads 41 to engage over the surfaces of the central portion, the sides and the inner faces of the pole pieces of the armature body for covering and insulating same. The inner ends of laterally extending flanges 42 on each spool member extend inwardly toward the flanges on the spool member at the opposite end to sufficient extent to space and insulate wire coil windings 43 usually wound from enamel coated small gauge copper wire, from contacting the metallic edges of the laminations of the armature body.

A commutator 44 is mounted on the end of armature shaft 31 engaged in bearing 29 adjacent the end of central cylindrical portion 39 of adjacent plastic spool 38. Commutator 44 extends into cylindrical bearing extension 20 formed on plastic cap member 17, as shown in FIG. 4. Commutator 44 is formed of a molded plastic body 45, such as Bakelite, and has a central bore formed to engage over shaft 31 and engage knurled surface 33 on shaft 31. Molded plastic body 45 is pressed on to the knurled portion of shaft 31 to rigidly secure the commutator on the shaft to rotate therewith. The outer surface of body 45 carries a plurality of commutator segments 46 arranged in cylindrical relation about the outer surface of the body. The outer ends of the segments are spaced a small distance apart sufficient to insulate each segment from the other. Each commutator segment is of arcuate form and has the inner surface formed with longitudinally extending channels 47 having the molded plastic material of body 45 filling these channels and locking segments 46 in cylindrical relation on the outer surface of the body. The inner ends of each segment are provided with tabs 48 outwardly in inclined relation therefrom for the purpose of having the ends of coil windings 43 soldered thereto to place the coil windings in electrical circuit connection with the commutator segments. The armature segments are equal in number to the coil windings on the armature and are arranged in aligned axial relation with the pole pieces of the armature body. A compression spring 49 or thrust member is engaged between bearing 29 and the outer end of commutator 44, as shown in FIG. 4 to maintain thrust bearing cone 32 in constant bearing engagement with thrust bearing 5 to prevent end wires vibrating movement of the armature during rotation thereof in the operation of the electrical machine or motor. This retention of the armature shaft against axial movement during operation, retains the armature body with the windings in centered relation between the ends of stator 11. The armature body has a length equal approximately to half the length of stator 11.

Supporting or cap member 17 has radially extending square channels 50 formed in the plate portion thereof for slidably receiving and guiding square commutator brushes 51 having the inner ends engaging the cylindrical surface of commutator 44 and commutator segments 46 to provide an electrical circuit through commutator segments 46 with armature coils 43. A pair of these commutator brushes 51 are mounted in diametrical relation in cap member 17 and have flexible wire leads 52 secured to the outer ends thereof and connected to connect members on cap member 17. Springs 53 have a plurality of loops slidably engaged on metal bushings 21 adjacent cap member 17 with opposite ends extending outwardly therefrom in tensioned relation. One end extends into a slot communicating with square channels 50 and has a laterally extending terminal portion engaging the outer end of commutator brush 51 for normally moving the brush inwardly to retain the inner end in engagement with the commutator segments. Two springs 53 are provided one for operating each brush. The other end of each spring is engaged with the outer surface of cap member 17. Flexible wire leads 52 have the free ends attached to contacts 54 and 55 secured on the outer face of end cap 17 by a flange on metal bushings 21, one contact being secured to each bushing.

With the flexible wire leads 52 from commutator brushes 51 secured to contacts 54 and 55 having electrical connection with bushings 21 at a pair of opposite corners of cap member 17, an electrical circuit connection is provided through the brushes with screws 23 securing cover section 2 of the casing in position. The heads on screws 23 are located and exposed on the outside of end wall 25, as shown in FIG. 2. This provides a connection so that a suitable source of electrical supply can be directly placed in circuit with the armature windings for operating the motor when desired.

The intermediate corners of end or cap member 17 have prong members 56 and 56' mounted thereon by rivets or other suitable means. Contact 54 is formed with a flexible arm extending toward prong member 56 and carries a contact point at the free end thereof opposite prong member 56 for engaging a contact point on prong member 56. The arm on contact 54 is resilient and normally moves the contact carried thereby away from the contact on prong member 56 so as to open the electrical circuit between contact 54 and prong member 56. Contact 55 has a fuse wire connection providing a circuit between one of the commutator brushes and prong member 56' for a purpose to be presently described.

A control switch 60 has a cylindrical sleeve portion 61 rotatably engaged over the cylindrical outer surface of bearing projection 20 on cap member 17 with the end of the sleeve portion adjacent to the outer face of plate portion 17. The outer end of sleeve portion 61 has a radial segment 62 formed thereon and a handle projection 63 projecting axially outward from the central portion of radial segment 62. Cylindrical sleeve portion 61 of control switch 60 is formed with a longitudinally extending rib 64 and the opposite side of said sleeve portion is formed with longitudinally extending spaced parallel grooves 65 for controlling rotation of the control switch between "on" and "off" positions. Contact 55 has a resilient arm extending at right angles thereto formed with a V-shaped end portion engaging in one of the longitudinally extending spaced parallel grooves 65 for retaining control switch 60 in either the "on" or "off" positions. In the "on" position of control switch 60 longitudinal rib 64 operates contact arm 54 to engage prong member 56 to close the electric circuit to the motor through prong member 56.

Cover section 2 of the casing has an inwardly extending wall portion 66 terminating in a retaining wall 67 formed with a double wedge-shaped slot 68 in which the outer ends of slot 68 are wider than the central portion. Slot 68 is formed in cover section 2 to receive outwardly projecting handle projection 63 on control switch 60 so that it is housed within the recess provided by cylindrical wall portion 66 and retaining wall 67. Retaining wall 67 has the inner face positioned in adjacent relation to the outer face of radial segment 62 on control switch 60 for effectively retaining control switch 60 in rotatable engagement with bearing projection 20 of cap member 17. The edges of retaining wall 67 forming double wedge-shaped slot 68 provide means for limiting the rotative movement of control switch 60 between the "on" and "off" positions. The outer face of radial segment 62 of control switch 60, is provided adjacent opposite ends of handle projection 63 on opposite sides thereof with the designations "on" and "off" for indicating to the user of the shaver the position in which the switch is located. End wall 25 of cover section 2 is formed with inwardly extending projections 69 and 70 integral in part with cylindrical wall portion 66 and forming an interruption in the cylindrical shape of wall portion 66, as shown in FIG. 6, for providing sockets opening through the outer face of end wall 25 and having the inner end formed with a rectangular slot to slidably receive prong members 56 in projection 70 and prong member 56' in projection 69 carried by end supporting member 17 of the motor. Each of the sockets formed by projections 69 and 70 are formed of a different shape to prevent engagement of a contact member in the socket having a shape other than the shape of the socket. The purpose of this will be hereinafter described in connection with illustrating how the user is prevented from engaging an attachment plug in the sockets 69 and 70 formed in end wall 25 in other than one position determined by the shape of the socket.

Supporting section 1 of the casing has two pairs of inwardly extending angularly arranged projections 71 formed adjacent the end cap portion or bearing support formed in section 1 for the motor. These pairs of projections provide two cradles at opposite sides of the motor and at the end portions of supporting section 1 to receive and support one end of a pair of storage batteries 72 at opposite sides and parallel to stator assembly 11. Supporting or cap member 17 has opposite ends aligned with the ends of supporting section 1 formed to provide a pair of cradle portions for the opposite ends of the pair of batteries so they may be rigidly supported on the shaver in parallel relation to the motor at opposite sides thereof and over opposite ends of supporting section 17 within cover section 2. These storage batteries 72 are retained in position in the cradle projections 71 and on end member 17 by means of a retaining band 73. Retaining band 73 may be in the form of a fabric strip provided on one face with a suitable adhesive, such as pressure sensitive adhesive, which may be tightly stretched entirely around the outside of both storage batteries 72 and the intermediate portion of stator assembly 11 for firmly retaining the storage batteries engaged with their cradles. These storage batteries are electrically connected in series with the electric motor through commutator brushes 51. For this purpose, the outside casing of each battery forms the negative treminal battery and the end cap on one end forms the positive terminal. The outside casing of one battery 72 has a strip or wire connection attached thereto and connected to contact 55. A fuse wire connects contact 55 to prong member 56; as indicated at 74. The center contact of the other battery 72 is connected by wire 75 to prong member 56. The central terminal of the first mentioned battery 72 is connected to the casing of the second mentioned battery 72 by a wire 76. This connects the batteries in series with each other and with commutator 44 through commutator brushes 51 under the control of control switch 60 which is operable to open and close the circuit through the motor by the operation of the flexible contact arm or contact 54.

A charger 80 in the form of a separate unit mounted in charger casing 81 is adapted for detachable connection to the shaver casing. Charger casing 81 has a pair of oppositely formed casing sections provided with projections on one casing section for inter-engagement in complementary relation with sockets in the other casing section to hold the casing sections with the edges engaged in casing forming relation to provide a compartment for the charging means and other elements housed therein. One casing section is provided with bores to receive attaching screws adapted to be threaded into sockets in the other casing section aligned with the bores in assembled relation for threadedly receiving the screws to secure the two casing sections together. Charger casing 81 has an attaching wall portion 82 with the intermediate portions of the wall offset inwardly from the marginal portions of the sides and ends of the casing to provide an open end recess on the attaching wall for receiving end wall 25 of cover section 2 of the shaver casing in engaged relation therein with the marginal portion of attaching wall 82 engaging the marginal seat portion 83 formed on cover section 2. This arrangement fixes the position of the charger casing in its engaged relation with the shaver casing when the two casings are attached together.

Attaching wall portion 82 has a rectangular central opening formed therein and a ledge 85 offset inwardly in substantially parallel relation to attaching wall 82 to define the margins of the rectangular opening and cooperate with wall portion 82 to define a guide channel for slidably receiving the marginal portions of a plug contact member 86. Ledge 85 and the channels formed between ledge 85 and attaching wall portion 82 cooperate to engage and retain plug contact member 86 detachably connected with the casing sections in assembled relation. Plug contact member 86 may be formed of nylon or other similar plastic material to provide a flat plate portion 87 of substantially rectangular form having the marginal portion thereof engaged in the channels forming the edges of the rectangular aperture in attaching wall 82.

A pair of opposite corners of plate member 87 are formed with outwardly extending plug projections 88 and 89. Plug projection 88 has three sides arranged in position to form a substantially square shape with rounded corners while one corner is beveled to provide a special outside shape for the side walls of the plug projecting from plate member 87. Plug projection 88 is formed with a chamber to receive spring contact member 90 formed with a crimped portion on the inner end engaged over an inwardly extending contact support 91 formed on plate member 87 at the base of projection 88 in inwardly extending relation from the plate member. Plug projection 89 has three side walls arranged in substantially square relation, the two opposite side walls having a shorter length than the connecting side wall with rounded corners joining the three side walls. The remaining portion of plug projection 89 is formed in triangular relation extending from the free edges of the opposite parallel side walls to form a rounded projection with tapered side walls connected with the spaced parallel side walls. This provides a shape for plug projection 89 that is different from plug projection 88. A spring contact member 92 is mounted in plug projection 89 and has the outer end extending into the charger casing and supported on contact support 93. Spring contact members 90 and 92 extend to the outer ends of plug projections 88 and 89 respectively. The outer ends of plug projections 88 and 89 have rectangular slots formed therein to receive the ends of prong members $56^1$ and 56 respectively, when plug contact member 86 has plug projections 88 and 89 engaged in the sockets formed by inwardly extending projections 69 and 70 respectively. Plug projection 88 is formed to correspond with the shape of the socket in inwardly extending projection 69 while plug projection 89 is formed to fit and slidably engage in the socket formed in inwardly extending projection 70. When plug projections 88 and 89 are engaged in sockets in inwardly extending projections 69 and 70, prong projections $56^1$ and 56 slidably engage in plug projections 88 and 89 through the slots formed in the outer ends thereof for slidably engaging with spring contact members 90 and 92, respectively, to provide an electrical circuit connection between the spring contact members carried by the charger casing and prong projections 56 and $56^1$ carried by cap member 17.

Plate member 87 has a pair of spaced parallel switch-operating projections 94 formed on the outer face thereof projecting outwardly in parallel diagonal relation between plug projections 88 and 89 toward the intermediate opposite corners of the plate member. One inner face at the opposite end of each projection is formed with an inclined cam portion 95. When charger casing 81 is slidably engaged with the shaver casing with plug projections 88 and 89 engaged into the sockets formed in wall 25 of cover section 2, the movement of the charger casing into engagement with the shaver casing will move switch operating projections 94 toward handle projection 63 on control switch 60. If control switch 60 is in the "on" position causing the motor circuit to be closed for operation of the motor from the batteries, inclined cam portions 95 on each switch operating projection 94 will engage opposite ends of handle projection 63 and move the handle from the "on" position to the "off" position as the charger casing is moved into full interengaged relation with the shaver casing. This provides an automatic manual operation of control switch 60 during manual engagement of the charger casing with the shaver casing to open the circuit between the storage batteries and the shaver motor. This insures that the shaver motor is not running while the storage batteries are being charged by the charging means which may be partially contained in the charger casing and partially contained in the shaver casing in which the charging circuit for the storage batteries is connected between the charging and shaver casings by engagement of spring contact members 90 and 92 with prong members 56′ and 56.

During engagement of the charger casing with the shaver casing, handle projection 63 on control switch 60 has the outer edge portion engage plunger 96 slidably mounted in plate member 87 between switch operating projections 94 in the center of the plate portion. Plunger 96 is provided with an enlarged head portion at the inside end adjacent plate member 87 having a pin on the inner end thereof extending into a slot in movable contact 97 detachably mounted on terminal projection 98. The head on plunger 96 engages the central portion of movable contact 97 on opposite sides of the slot so that when handle projection 63 engages the outer end of plunger 96 it will move the plunger inwardly through plate member 87 and cause the free end of movable contact 97 to engage the free end of stationary contact 99 mounted on terminal projection 100. Terminal projections 98 and 100 are formed at opposite intermediate corner portions of plate member 87 in inwardly extending relation from the inner face thereof to support movable and stationary contacts 97 and 99 respectively, in spaced relation inwardly of the inner face of plate member 87. These contacts control the charger circuit connections in the charger casing to open and close the circuit with a source of electrical supply to which the charger casing may be connected. It will be understood that the charger circuit is closed only when the charger casing is in full attached relation with the shaver casing in the manner hereinabove described, at which time handle projection 63 in operating plunger 96 moves and holds movable contact 97 engaged with stationary contact 99.

The charger circuit which may include portions mounted in the charger casing and portions mounted in the shaver casing includes a conventional type of dry plate rectifier indicated at 101. This dry plate rectifier 101 may include a selenium type rectifier having a pair of spaced terminal plates 102 with a selenium plate 103 engaged between the pair of terminal plates 102 to form a rectifier cell. Four of these cells made up of plates 102 and 103 are preferably employed which are connected in a bridge circuit indicated at 104 in the wiring diagram in FIG. 19.

A condenser 105 has one terminal connected with one terminal of the bridge circuit by a wire 106 and the opposite terminal connected by wire 107 to one terminal or resistor 108 and terminal 109 of the terminal member 110 mounted in the socket portion 111 formed in one end of the charger casing. The other terminal 112 of the terminal member mounted in socket portion 111 is connected by a wire to fuse member 113. The other terminal of fuse 113 has a wire connection to stationary contact 99. Movable contact 97 is connected by a wire 114 to the other terminal of resistor 108 and the opposite corner of bridge 104 from the connection of wire 106 therewith. Terminal members 109 and 112 in socket portion 111 form attaching prongs for receiving a plug connection from an attaching cord adapted to be detachably connected therewith and having a plug on the opposite end of the cord for engagement in the usual conventional outlet socket of a 110-volt electrical supply circuit of the conventional form found in most buildings. A bridge 104 from those to which wires 106 and 114 are connected, have wire connections 115 to spring contact member 92 forming the positive side of the charging circuit extending through prong member 56 carrying the contact terminal having a wire connection with the positive terminal of the storage battery. Wire 116 connects the other end of intermediate contact of bridge 104 with the negative terminal of the storage battery by being secured to spring contact member 90 engaging prong member 56' having an electrical connection with the casing of one of the storage batteries.

While two storage batteries are illustrated in the disclosure in the drawing of the present application, it will be understood that any number of storage batteries of the conventional rechargeable dry type now being currently used may be employed in the present shaver construction for operating the shaver motor. These storage batteries usually have a voltage of approximately one and one-quarter volts per cell and in the present shaver the use of two storage cells for operating the shaver motor provides two and one-half volts for operating the motor. The motor is therefore designed for operation on two and one-half volts direct current which is delivered by the storage batteries connnected in circuit, as disclosed in the wiring diagram in FIG. 19 and as hereinabove described in the description of the various connections between the parts of the shaver. A two and one-half volt supply source of direct current may also be used to operate the motor independently of the battery by providing contacts engaging screws 23 in the sockets 24 in the outside of supporting wall 25 of cover section 2.

The selenium rectifier hereinabove described and illustrated in the wiring diagram in FIG. 19 in providing the four cell selenium bridge dry rectifier construction rectifies the alternating current supply from a 110 volt supply source into a pulsating direct current for charging the storage batteries when the motor is not in operation. When the charger casing is interengaged in attached relation as above described with the shaver casing to close the charger circuit portions between the charger casing and the shaver casing, it will open control switch 60 to open the circuit to the motor so that the charger circuit to the batteries will be closed for providing a means for charging the battery over a given period of time at a low charging rate.

Condenser 105 provides an impedance in the circuit to the rectifier bridge 104 for reducing the line voltage sufficiently to provide a voltage in the storage battery circuit slightly higher than the battery voltage for charging the batteries in a well known manner. Resistor 108 is a bleeder resistance for the condenser.

What is claimed is:

1. An armature for electric machines comprising an armature shaft having intermediate portions knurled, an armature body formed of a plurality of corresponding sheet metal laminations mounted in adjacent surface contact and each having a central portion formed with an aperture smaller than the knurled portions of said shaft, said laminations being pressed onto said intermediate knurled portions of said shaft into rigid attached relation on said shaft, said armature body having radially extending arms terminating in pole pieces at the outer ends, plastic spool members slidably engaged on opposite ends of said armature shaft at opposite ends of said armature body, flange portions on said spool members covering the end and side surfaces of said central, arm and pole piece portions of said armature body to provide an insulated support on said armature body, and coil windings on said insulated support on said arms of said armature body insulated by said spool members from said armature body.

2. An armature for electric machines as claimed in claim 1, wherein a commutator is formed of a plastic insulating body pressed onto a knurled portion of said shaft and rigidly held in position, said insulating body having a plurality of commutator segments mounted with the outer surfaces in cylindrical spaced relation on the outer surfaces thereof, said segments having attaching means formed on the inner surfaces thereof, said insulating body having portions thereof interengaged with said attaching portions for rigidly mounting said segments thereon.

3. Insulating means for an armature body having a plurality of radially extending arms terminating in pole pieces at the outer ends thereof, said insulating means comprising a spool member of non-conductive material adapted for slidable engagement on the shaft at one end of said armature body, a plurality of radially extending insulating arms on said spool corresponding in number to and registering with the arms of the armature body for engagement with said one end of the armature body and, laterally extending flange portions on said insulating arms adapted for insertion between adjacent arms of said armature body for engagement with the side surfaces of said armature body, said insulating arms providing a support on the armature body for receiving coil windings and said flanges adapted to space and insulate the coil windings from the arms of the armature body.

4. The insulating means of claim 3 wherein said spool member includes a central sleeve portion adapted for slidable engagement on the armature shaft with said insulating arms extending radially from said sleeve portion, and head flanges on the outer ends of said arms to position and retain the coil windings thereon.

References Cited by the Examiner
UNITED STATES PATENTS

| | | | |
|---|---|---|---|
| 1,778,678 | 10/1930 | Knecht | 310—269 |
| 1,813,333 | 7/1931 | Wilson | 310—235 |
| 1,838,150 | 12/1931 | Papst | 310—269 |
| 2,236,257 | 3/1941 | Borchers | 310—235 |
| 2,269,651 | 1/1942 | Crocker | 310—261 X |
| 2,541,047 | 2/1951 | Frisbie et al. | 310—235 |
| 2,629,064 | 2/1953 | Lewis | 310—235 |
| 3,080,615 | 3/1963 | Carlson et al. | 310—235 X |

MILTON O. HIRSHFIELD, *Primary Examiner.*

ORIS L. RADER, *Examiner.*

L. L. SMITH, *Assistant Examiner.*